Nov. 20, 1923.  
G. HOWARD  
1,474,825  
PORTABLE COOKING OUTFIT  
Filed Nov. 27, 1922  
2 Sheets-Sheet 2
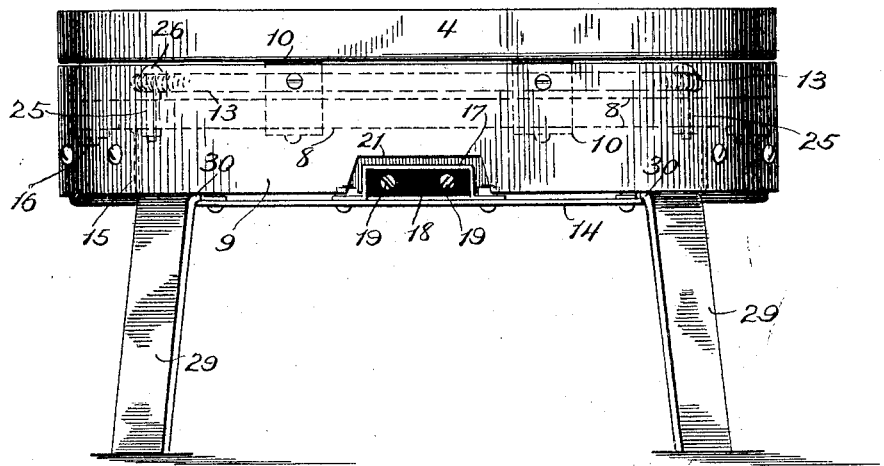
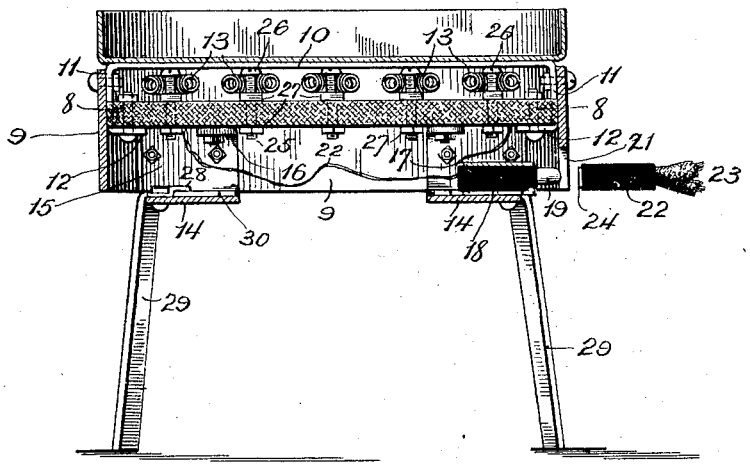
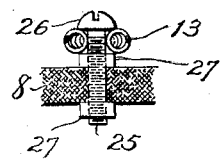
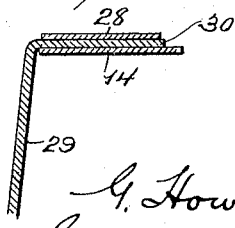
Inventor  
G. Howard  
By Seymour & Bright  
Attorneys Patented Nov. 20, 1923.

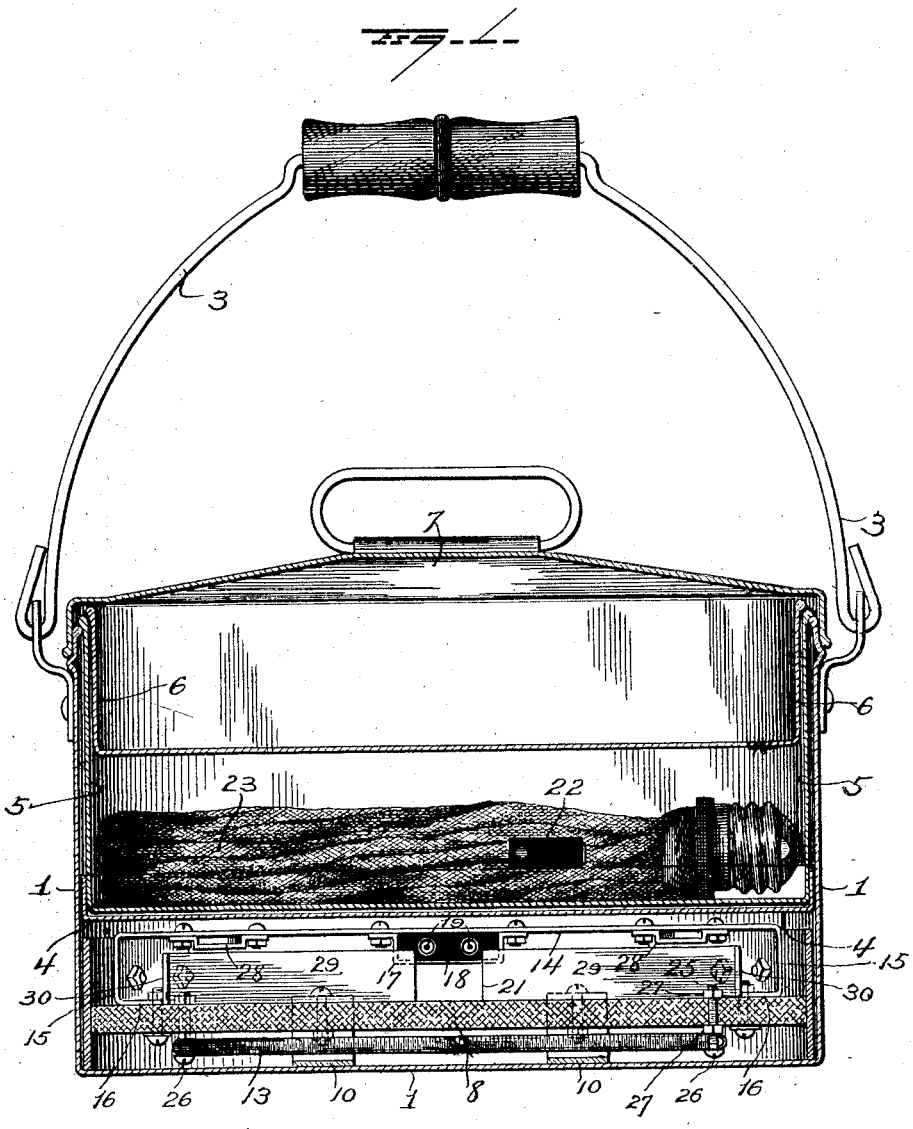

1,474,825

UNITED STATES PATENT OFFICE.

GEORGE HOWARD, OF MICHIGAN CITY, INDIANA.

PORTABLE COOKING OUTFIT.

Application filed November 27, 1922. Serial No. 603,582.

*To all whom it may concern:*

Be it known that I, GEORGE HOWARD, a citizen of the United States, and a resident of Michigan City, in the county of Laporte and State of Indiana, have invented certain new and useful Improvements in Portable Cooking Outfits, and do hereby declare the following to be a full, clear, and exact description of the invention, such as will enable others skilled in the art to which it appertains to make and use the same.

This invention is a portable cooking outfit and is intended more particularly for the use of night watchmen although it may be advantageously employed in other fields. The invention has special reference to the stove and its objects are to provide an electric stove which may be easily disposed in compact form within a dinner pail and as readily set up for use when needed, to provide simple and efficient means for securing the heating in place, to provide a novel construction for supporting the electric terminals, to provide a novel support for the stove, and to improve generally the construction of a portable electric stove whereby it will be especially adapted for use in connection with a dinner pail. The stated objects and other objects which will incidentally appear in the course of the following description are attained in such a device as is illustrated in the accompanying drawings, and the invention resides in certain novel features which will be particularly pointed out in the claims following the detailed description.

In the drawings, Figure 1 is a vertical longitudinal section of a dinner pail containing my improved stove, the parts being arranged as when the pail is to be carried.

Figure 2 is a perspective view of the stove, set up for use;

Figure 3 is a central transverse section through the stove;

Figure 4 is a detail section showing the manner of securing the heating coil;

Figure 5 is a detail section showing the engagement of one of the legs with the stove.

The dinner pail 1 may be of any desired size and is preferably elliptical in form, being equipped with the usual carrying bail or handle 3. Adapted to nest within the pail and to rest upon the stove as needed, are a frying pan 4, a kettle or boiler 5, and a smaller kettle or pan 6, a cover 7 being provided to fit over the pail or over any one of the elements 4, 5 or 6 which may be upon the stove. The pail 1 may, of course, be utilized as a cooking vessel.

The stove includes a body of elliptical outline which is adapted to fit within the pail below the other utensils when not in use. The body of the stove comprises a plate 8 of asbestos or other inexpensive insulating material, and a rim 9 of some rigid material, preferably metal. Two or more cross bars 10 extend over the plate 8 in spaced relation thereto, and the ends 11 of the cross bars are turned downwardly and secured rigidly to the rim 9, terminating in inwardly projecting ears 12 beneath and secured to the plate whereby to support the same.

The heating coil 13 is disposed on the upper side of the plate 8 and is carried back and forth the same longitudinally thereof, as shown in Figure 2, the end portions of the wire forming the coil being carried through the plate adjacent the side edges thereof at the centre of the same, as shown. Below the plate 8, the rim 9 is reenforced by longitudinal bracing plates 14 which are disposed adjacent the side portions of the rim and have their ends bent upwardly and secured rigidly to the rim, as at 15, and to the under side of the insulating plate, as at 16. On one of the longitudinal braces 14 is secured a loop or bracket 17 in which is snugly received a block 18 of insulation carrying the terminals 19 and the end portions 20 of the heating wire are carried into said block and connected to the terminals in any convenient effectual manner. A notch 21 is formed in the lower edge of the rim 9 in alinement with the block 18 to admit a terminal coupling block 22. The block 22 is fitted on one end of an electric cable 23 which is equipped with a plug 24 to be engaged in an ordinary electric socket in a well-known manner to transmit electric energy. The block 22 is, of course, constructed with sockets to engage the terminals 19 and each socket is constructed to effect electrical engagement between the engaged terminal and one conducting wire of the cable. It will be readily noted that the terminals 19 are so disposed that they do not project outwardly beyond the rim so that while they may be readily engaged by the terminal coupling block they are protected from chance blows when not in use and, moreover, do not interfere with the placing of the stove in the pail or its removal therefrom.

The heating coil rests on the insulating plate 8 and at its bends or turns is held against displacement by bolts 25 which pass vertically through the plate and have their heads 26 engaged over the coil as shown clearly in Figure 4. Locking nuts 27 are mounted on the bolts against the top and bottom of the plate so that the bolts will be positively and firmly secured in place.

The outer edges of the longitudinal braces 14, adjacent the ends thereof, are slightly below the lower edge of the rim 9, and keeper plates 28 are secured upon the braces at these points forming, with the braces, sockets to be engaged by the supporting legs which consist of flat bars 29 each having one end 30 bent at a right angle to its main portion forming a head which may be easily inserted between a keeper 28 and the brace 14 to detachably connect the leg to the stove.

When the device is to be used, the stove is set up as shown in Figure 2, when the device is to be carried, the legs are withdrawn and the stove is then placed in the pail, after being inverted, so that it will rest on the bottom of the pail and the legs may be placed edgewise upon the plate 8 and engaged under the braces 14 sufficiently to be held against moving about. The cable may be placed in either pan 5 or 6 and the several vessels nested as shown in Figure 1.

Having fully described my invention what I claim as new and desire to secure by Letters-Patent, is:—

1. An electric stove including a body having a rim, longitudinal braces on the under side of the rim, keepers secured on said braces, and legs having their upper ends detachably engaged in said keepers.

2. An electric stove including a body plate of insulation, a rim secured to and bounding said plate, a longitudinal brace secured to the rim below the plate, a terminal block carried by said brace, and a heating coil disposed on the upper side of the body plate and having its end portions carried through the plate and secured to the terminal block.

3. An electric stove comprising a body plate of insulation, a rim secured around said plate and provided with a notch in its lower edge, a terminal block supported below the plate spaced inwardly from the rim and in alinement with the notch, and a heating coil disposed on the upper side of the plate and having its end portions extended through the plate and secured to said terminal block.

4. In an electric stove, the combination of a body plate of insulation, a heating coil disposed thereon, bolts inserted through the plate within the bights of the coil, and nuts fitted on the bolts against the upper and lower sides of the plate.

5. An electric stove including a body plate of insulation, a heating coil disposed on the upper side of the plate, a rim disposed around the plate, and cross bars extending over the plate and the coil and having their ends extended downwardly and secured to the rim and inwardly below and secured to the plate.

In testimony whereof, I have signed this specification in the presence of two subscribing witnesses.

GEORGE HOWARD.

Witnesses:
HENRY W. HUNZIKER,
CLARENCE J. PETERS,